US007015286B2

(12) United States Patent
Heilmann et al.

(10) Patent No.: US 7,015,286 B2
(45) Date of Patent: *Mar. 21, 2006

(54) REACTIVE OLIGOMERS

(75) Inventors: Steven M. Heilmann, Afton, MN (US); Babu N. Gaddam, Woodbury, MN (US); Ahmed S. Abuelyaman, Woodbury, MN (US); Duane D. Fansler, Dresser, WI (US); Todd D. Jones, St. Paul, MN (US); Maureen A. Kavanagh, Stanchfield, MN (US); Kevin M. Lewandowski, Inver Grove Heights, MN (US); Michael S. Wendland, North St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 65 days.

This patent is subject to a terminal disclaimer.

(21) Appl. No.: 10/455,571

(22) Filed: Jun. 4, 2003

(65) Prior Publication Data
US 2003/0212210 A1 Nov. 13, 2003

Related U.S. Application Data

(62) Division of application No. 09/884,173, filed on Jun. 19, 2001, now Pat. No. 6,635,690.

(51) Int. Cl.
*C08L 87/00* (2006.01)
(52) U.S. Cl. .................. 525/191; 525/203; 525/204; 525/213; 525/228
(58) Field of Classification Search ................ 525/191, 525/203, 204, 228, 213
See application file for complete search history.

(56) References Cited

U.S. PATENT DOCUMENTS

| | | | |
|---|---|---|---|
| 2,803,656 A | 8/1957 | Ahlbrecht et al. | |
| RE24,906 E | 12/1960 | Ulrich | |
| 3,598,790 A | 8/1971 | Kollinsky et al. | |
| 4,181,752 A | 1/1980 | Martens et al. | |
| 4,243,500 A | 1/1981 | Glennon | |
| 4,329,384 A | 5/1982 | Vesley et al. | |
| 4,330,590 A | 5/1982 | Vesley | |
| 4,364,972 A | 12/1982 | Moon | |
| 4,391,687 A | 7/1983 | Vesley | |
| 4,507,466 A | 3/1985 | Tomalia et al. | |
| 4,558,120 A | 12/1985 | Tomalia et al. | |
| 4,568,737 A | 2/1986 | Tomalia et al. | |
| 4,587,329 A | 5/1986 | Tomalia et al. | |
| 4,631,337 A | 12/1986 | Tomalia et al. | |
| 4,678,846 A | 7/1987 | Weitemeyer et al. | |
| 4,680,352 A | 7/1987 | Janowicz et al. | |
| 4,694,054 A | 9/1987 | Janowicz | |
| 4,694,064 A | 9/1987 | Tomalia et al. | |
| 4,713,975 A | 12/1987 | Tomalia et al. | |
| 4,737,550 A | 4/1988 | Tomalia | |
| 4,777,276 A | 10/1988 | Rasmussen et al. | |
| 4,798,852 A | 1/1989 | Zimmerman et al. | |
| 4,812,541 A | 3/1989 | Mallya et al. | |
| 4,857,599 A | 8/1989 | Tomalia et al. | |
| 4,871,779 A | 10/1989 | Killat et al. | |
| 4,908,229 A | 3/1990 | Kissel | |
| 4,968,562 A | 11/1990 | Delgado | |
| 5,081,197 A | 1/1992 | Heilmann et al. | |
| 5,091,489 A | 2/1992 | Heilmann et al. | |
| 5,122,567 A | 6/1992 | Spada et al. | |
| 5,202,361 A | 4/1993 | Zimmerman et al. | |
| 5,274,063 A | 12/1993 | Matsumoto et al. | |
| 5,362,826 A | 11/1994 | Berge et al. | |
| 5,418,301 A | 5/1995 | Hult et al. | |
| 5,726,249 A | 3/1998 | Barsotti et al. | |
| 5,741,543 A | 4/1998 | Winslow et al. | |
| 5,773,534 A | 6/1998 | Antonelli et al. | |
| 5,804,301 A | 9/1998 | Curatolo | |
| 5,804,657 A | 9/1998 | St. Clair et al. | |
| 5,886,064 A | 3/1999 | Rheinberger et al. | |
| 5,907,024 A | 5/1999 | Ohrbom et al. | |
| 5,948,866 A | 9/1999 | Takeda et al. | |
| 6,007,833 A | 12/1999 | Chudzik et al. | |
| 6,057,034 A | 5/2000 | Yamazaki et al. | |
| 6,448,301 B1 | 9/2002 | Gaddam et al. | |
| 6,448,337 B1 | 9/2002 | Gaddam et al. | |
| 6,635,690 B1 * | 10/2003 | Heilmann et al. | 522/111 |
| 2003/0216519 A1 | 11/2003 | Heilmann et al. | |
| 2005/0131148 A1 * | 6/2005 | Lewandowski et al. | 525/187 |

FOREIGN PATENT DOCUMENTS

DE    37 10 7698 A1    1/1988

(Continued)

OTHER PUBLICATIONS

P. Peyser, "Glass Transition Temperatures of Polymers", Navel Research Laboratory, Washington, D.C., pp. VI/209-VI/227.

(Continued)

Primary Examiner—Jeffrey Mullis
(74) Attorney, Agent, or Firm—Kent S. Kokko

(57) ABSTRACT

The present invention provides melt-processible adhesive compositions prepared from a first oligomer containing reactive functional groups capable of reaction at effective rates (at normal processing temperatures) with a co-reactive second component oligomer possessing functionality that is complementary to that of the first oligomer. The compositions may be used as coatings, including hard surface coatings, clear coatings, powder coatings and pattern coatings; as adhesives, including pressure sensitive adhesives and hot melt adhesives; as sealants; as optical coatings; as blown microfibers (BMF); as high refractive index optical materials; as barrier films; in microreplication; as low adhesion backsizes, (LABs) and as release coatings.

30 Claims, No Drawings

FOREIGN PATENT DOCUMENTS

| | | |
|---|---|---|
| EP | 0 718 332 A2 | 6/1996 |
| EP | 0 718 332 A3 | 7/1997 |
| EP | 0 874 012 A1 | 10/1998 |
| EP | 0 718 332 B1 | 3/2003 |
| JP | 57-193580 | 11/1982 |
| JP | 58-46236 | 10/1983 |

OTHER PUBLICATIONS

M. Shirai et al., *"Photoacid and Photobase Generators: Prospects and Their Use in the Development of Polymeric Photosensitive Systems"*, Chemical Society of Japan, (1998), pp. 2483-2507, vol. 71.

* cited by examiner

REACTIVE OLIGOMERS

This application is a divisional of U.S. Ser. No. 09/884,173, filed Jun. 19, 2001, now U.S. Pat. No. 6,635,690, the disclosure of which is herein incorporated by reference.

TECHNICAL FIELD OF THE INVENTION

This invention relates to novel step growth crosslinkable oligomer compositions and articles prepared therefrom.

BACKGROUND OF THE INVENTION

Polymers have been widely investigated in the coatings industry for a number of applications, such as adhesives, sealants, clear coats, powder coats, and low adhesion backings. With appropriate choice of polymer backbone, they can be applied to a wide variety of surfaces. For example, acrylates typically have good adhesion to polar surfaces, and exhibit useful mechanical properties and good weatherability over a wide range of temperatures. Processability and final properties of polymers can often simultaneously be enhanced by a post-processing reaction, such as crosslinking. As a result, this has been an area of much interest and research.

High molecular weight polymers ($M_n$>100 kg/mol) can be coated through the use of solvent. These materials can subsequently be crosslinked through the addition of polyfunctional crosslinking agents that react with functionalities in the polymer, as described in Japanese Kokoku No. 58[1983]-046236. Alternatively, the use of an additional crosslinker can be avoided through the incorporation of suitable complementary functionalities within the polymer for latent crosslinking reactions. This approach has been described in U.S. Pat. No. 4,812,541, using N-vinyl lactam and glycidyl monomers. Similar pendant functional group-containing polymers are also described in U.S. Pat. Nos. 4,908,229, 5,122,567, and 5,274,063. These methods typically require the use of solvent for coating. Hot-melt coating offers advantages over these techniques both in terms of economics and environmental impact.

While these patents describe applications in the area of pressure sensitive adhesives, similar strategies have been used in a number of other applications. U.S. Pat. No. 4,678,846 describes a radiation curable release coating, or low adhesion backing, incorporating acrylate functionality on polydimethylsiloxane polymers. U.S. Pat. No. 5,804,301 describes a radiation curable coating suitable as an ink receptor, including a polyfunctional acrylic oligomer of low molecular weight. U.S. Pat. No. 4,798,852 describes a radiation-curable coating for optical glass fiber. In each case, these methods rely on subsequent treatment with radiation in order to effect crosslinking. In general, the effectiveness of the crosslinking is affected by the thickness of the coating. Thermal cures can thus offer advantages over crosslinking from non-thermal energy sources. However, thermal curing requires that the crosslinking be performed subsequent to coating, particularly when hot-melt coating is the method of choice.

Polymers can be applied as coatings using other methods, through appropriate choice of physical properties, such as the glass transition temperature Tg. For example, as described in U.S. Pat. No. 5,948,866, powders of moderate Tg (~40° C.) can be applied to a surface through electrostatic coating, and subsequently cured to form a uniform layer. This process is similar to hot-melt processing, in that no solvent or plasticizer is required, and is thus advantageous for economic and environmental reasons.

Alternative polymer backbones may also be of interest. In addition to the siloxane-containing materials described previously, fluorocarbon polymers are of interest due to their unique surface energy characteristics and chemical resistance, as well as their oleophobic and hydrophobic character. Polymer fluorocarbons are of great commercial interest in the area of stain and water repellency. Alternatively, polymers with great temperature resistance, such as polyaromatic compounds or cyclic olefin compounds, such as norbornenes, can be useful in specific applications. In general, these materials suffer from poor processing characteristics, such as very high viscosity at high molecular weight or poor solubility in common solvents. There is thus an opportunity for increased use of these materials if these processing limitations can be overcome.

In some cases, enhanced processability can be afforded by branched systems. Branched molecules can act to increase viscosity, through the presence of long-chain branches, or reduce viscosity, through a very high degree of short chain branching. As discussed in U.S. Pat. No. 5,726,249, the presence of branching is also known to enhance wear and chemical resistance in clear coats. Functional branched reactive polymers are thus useful in creating materials with enhanced mechanical and processing properties.

In certain situations, it can also be advantageous to have a mechanism of altering the properties of a coating or article during manufacture. This change in properties can be addressed through the use of a dual-cure system, permitting an initial network to be formed on the basis of one coreactive pair of functionalities. The crosslink density can subsequently be enhanced through reaction of a second pair of functionalities, as described in U.S. Pat. Nos. 5,804,657 and 5,907,024. This control of crosslink density is of much interest in the current art.

SUMMARY OF THE INVENTION

The current invention describes reactive, melt-processable materials that can be cured by a variety of step-growth mechanisms to yield uniform coatings. The component molecules and extent of reaction, or crosslink density, can be varied in order to provide specific properties for a range of applications, as described previously. The molecular weight of these materials is such that they can easily be processed, giving economic and environmental advantages. The materials can subsequently be cured through application of heat to yield improved final mechanical properties, without the thickness and exposure limitations imposed by radiation curing. Thus, these materials represent a significant advance of the current art.

In one aspect this invention provides a step growth curable oligomer composition comprising
   a) a first component oligomer, having a carbon-carbon backbone, comprising a plurality of polymerized monomer units comprising pendant reactive nucleophilic or electrophilic functional groups;
   b) a second polyfunctional component co-reactive with said first component oligomer selected from
     1) a second oligomer, having a carbon-carbon backbone, comprising a plurality of polymerized monomer units comprising co-reactive functional groups; and
     2) a dendritic polymer;

wherein at least one of a) and b) has a functionality of greater than 2 and wherein the composition is melt-processible at temperatures of 100° C. or less.

Briefly, the present invention provides novel compositions prepared from a first oligomer containing reactive functional groups capable of reaction at effective rates (at normal processing temperatures) with a co-reactive second component possessing functionality that is complementary to that of the first oligomer. By complementary is meant that if the oligomer's reactive functional groups are electrophilic in nature, the second component should possess co-reactive nucleophilic groups. The converse is also useful; when the oligomer contains reactive nucleophilic groups then the second component contains co-reactive electrophilic groups. In addition, reactions involving oligomeric reactants of the instant invention are controlled and precise in that they result in oligomer-oligomer coupling reactions only by reaction between the reactive and co-reactive functional groups.

In another aspect this invention provides a process of preparing a novel composition which comprises the steps of providing the novel oligomer composition of this invention, preferably further comprising an effective amount of a step-growth catalyst, and subjecting said composition to sufficient thermal energy to crosslink the first oligomer and second component by forming covalent bonds between the reactive and co-reactive functional groups by a step growth process.

In another aspect this invention provides a reactive composition that crosslinks and produces no or minimal by-products on reaction, and that achieves crosslink density by step-growth addition process. This invention has several advantages. The composition is low in viscosity, readily melt processible and coatable, and has minimal residuals content such as solvents, monomers, plasticizers and/or viscosity modifiers. The compositions can be rapidly and reliably prepared without requiring specialized equipment and without generating concerns about potentially toxic or irritating unreacted low molecular weight monomeric species or reaction products.

The compositions may be used as: coatings, including hard surface coatings, clear coatings, powder coatings and pattern coatings; as adhesives, including pressure sensitive adhesives and hot melt adhesives; as sealants; as optical coatings; as blown microfibers (BMF); as high refractive index optical materials; as barrier films; in microreplication; as low adhesion backsizes (LABs), and as release coatings.

The ability to vary the crosslink density permits the modification of properties suitable for the various applications described previously. The novel compositions of the present invention cure by means of reactive and co-reactive functional groups to form crosslinked compositions possessing tailorable properties such as shear, peel, release, strength, hardness, elasticity, and toughness, for example, through selection of the particular constituents, and by control of the crosslink density. While the requirements for adhesives and hard coats, for example, are very different, the structure of the material and density of linkages can be altered while still maintaining the same method of forming crosslinked compositions. The maximum crosslink density is predetermined by the percentage of functional groups incorporated into the crosslinkable composition. It may also be desirable to partially convert or cure a system for improved processing, while using a subsequent curing stage to obtain final properties. Such a curing process may be a two-stage process, wherein the same mechanism is used in both steps, or a dual-cure process, wherein two independent mechanisms are used to obtain the final crosslink density and properties.

As used herein, the term "residual(s)" means solvents, monomers, plasticizers and/or viscosity modifiers.

As used herein, the term "melt processible" or simply "processible" is used to refer to oligomer compositions that possess or achieve a suitable low viscosity for coating or extrusion at temperatures less than or equal to 100° C., using conventional extrusion or coating equipment without the need for addition of solvents, monomers, plasticizers and/or viscosity modifiers and without the need for extraordinary pressures. The present invention provides compositions having less than 2 weight percent residuals.

As used herein, the term "step-growth process" means reaction to form a covalent bond between organic functional groups possessing a complementary reactivity relationship, i.e., electrophile-nucleophile. The process may occur by functional group rearrangement in the case of step-growth addition or by the elimination of a small molecule such as water or an alcohol in the case of step-growth condensation.

As used herein, the term "crosslinking" means the formation of a polymeric network of infinite molecular weight and occurs in polymerizations with monomer reactants having functionalities greater than two. Additional information may be found in G. Odian, *Principles of Polymerization,* 3rd edition, 1991, John Wiley & Sons: New York, p. 108. A crosslink is formed between the reactive and co-reactive functional groups by a step growth process.

Advantageously, the present invention provides crosslinkable compositions that are readily processed without appreciable residual content such as solvents, monomers, plasticizers and/or viscosity modifiers. Curable systems containing residual content can give rise to a significant increase in density when transformed from the uncured to the cured state causing a net shrinkage in volume. As is well known, shrinkage can cause a general loss of adhesion in many instances as well as significant movement and unpredictable registration in precise bonding operations such as those required in microcircuit applications. Shrinkage can also create residual stress in coatings, which can subsequently lead to mechanical failure.

The composition of the present invention minimizes shrinkage due to solvent evaporation and/or monomer polymerization. The low shrinkage compositions of this invention are particularly useful in dental, molding applications or in any applications where accurate molding and/or registration is required. The present invention provides a new class of reactive oligomers that may be formulated as 100% solids, cured by thermal means and that exhibit properties that meet or exceed those of solvent-borne or syrup polymers. The present invention provides compositions that exhibit less than 2% shrinkage, and preferably less than 1%.

Further, the purity of the materials and clean environment for processing are also important to produce high performance materials. Polymers used for coatings and adhesives are often desirably delivered without significant amounts of volatile materials (such as monomeric species) to eliminate any contamination. However, the problems of residual volatile materials constitute a much more formidable challenge especially when acceptable limits of migratable, volatile impurities are on the order of a few parts per million. Industries such as medical and food packaging require materials of high purity and lower cost. The composition of the present invention avoids problems due to species contamination, having a residuals content of less than 2 weight percent, preferably less than 1 weight percent.

DETAILED DESCRIPTION OF THE INVENTION

The present invention provides crosslinkable compositions useful in the preparation of adhesives, coatings, blown microfibers, foams, high refractive index optical materials, low adhesion backsizes, release coatings and sealants. The compositions are prepared from oligomers having pendent reactive functional groups and are formed from ethylenically unsaturated monomers. The compositions comprise a step growth curable oligomer composition comprising:

a) a first component oligomer, having a carbon-carbon backbone, comprising a plurality of polymerized monomer units comprising pendant reactive nucleophilic or electrophilic functional groups;

b) a second polyfunctional component co-reactive with said first component oligomer selected from
1) a second oligomer, having a carbon-carbon backbone, comprising a plurality of polymerized monomer units comprising pendant functional groups co-reactive with said pendant reactive nucleophilic or electrophilic functional groups of said first component oligomer; and
2) a dendritic polymer comprising pendant functional groups co-reactive with said pendant reactive nucleophilic or electrophilic functional groups of said first component oligomer;

wherein at least one of a) and b) has a functionality of greater than 2 and wherein the composition is melt-processible at temperatures of 100° C. or less; and c) optionally a step growth catalyst.

The composition comprises, per 100 parts by weight of a first component, a sufficient amount of said second component to provide greater than two crosslinks per first component oligomer chain.

This invention also provides a crosslinkable oligomer composition comprising the oligomer composition and a step-growth catalyst.

The first oligomer, as well as the second oligomer (if present) comprises:

(1) from 0.01 to 99.99 parts by weight of polymerized monomer units derived from acrylic acid esters of non-tertiary alkyl alcohols containing 1–30 carbon atoms;

(2) from 99.99 to 0.01 parts by weight of a polymerized monomer units derived from an ethylenically-unsaturated monomer possessing co-reactive functional groups; (i.e. "functional monomers");

In one embodiment the first oligomer comprises:

(1) from 75.00 to 99.99 parts by weight of polymerized monomer units derived from acrylic acid esters of non-tertiary alkyl alcohols containing 1–14 carbon atoms;

(2) from 0.01 to 5.00 parts by weight of a polymerized monomer units derived from an ethylenically-unsaturated monomer possessing co-reactive functional groups; (i.e. "functional monomers");

(3) from 0 to 10 parts by weight of at least one polar monomer; ("polar monomers") and (4) from 0 to 10 parts by weight of other monomers (described below).

In another embodiment, essentially each repeat unit of the first oligomer may have a pendant reactive functional group, for example, poly(vinyl dimethyl azlactone).

The second component of the oligomer composition (b) may be a second oligomer or dendritic polymer having co-reactive functional groups. Where a second component oligomer is used, the oligomer may be prepared in situ provided that, prior to crosslinking, the residual content is less than 2 wt. %, or the second component oligomer may be separately prepared and added to the oligomer mixture. The crosslinked composition of the invention results from a step growth process by reaction of the reactive and co-reactive functional groups. The first oligomer component and the second component may be the same component provided that the oligomer contains both reactive and co-reactive pendant functional groups. Preferably, the first component oligomer and second component are not the same component.

Monomers that are useful and that comprise the major portion of the first and second oligomers are predominantly alkyl acrylate esters. Alkyl acrylate ester monomers useful in the invention include straight-chain, cyclic, and branched-chain isomers of alkyl esters containing $C_1$–$C_{30}$ alkyl groups. Due to $T_g$ and sidechain crystallinity considerations, preferred alkyl acrylate esters are those having from $C_5$–$C_{12}$ alkyl groups, although use of $C_1$–$C_4$ and $C_{13}$–$C_{14}$ alkyl groups are also useful if the combinations provide a molecule averaged number of carbon atoms between $C_5$ and $C_{12}$. However, for many applications, such as low adhesion backsizes (LABs) or release coating, higher, i.e. C12–C30 alkyl groups may be preferred. Useful specific examples of alkyl acrylate esters include: methyl acrylate, ethyl acrylate, n-propyl acrylate, 2-butyl acrylate, iso-amyl acrylate, n-hexyl acrylate, n-heptyl acrylate, isobornyl acrylate, n-octyl acrylate, iso-octyl acrylate, 2-ethylhexyl acrylate, iso-nonyl acrylate, decyl acrylate, undecyl acrylate, dodecyl acrylate, tridecyl acrylate, and tetradecyl acrylate.

Useful functional monomers include those unsaturated aliphatic, cycloaliphatic, and aromatic compounds having up to about 36 carbon atoms that include a functional group capable of further reaction, such as a hydroxyl, amino, azlactone, oxazolinyl, 3-oxobutanoyl (i.e., acetoacetyl), carboxyl, isocyanato, epoxy, aziridinyl, acyl halide, vinyloxy, or cyclic anhydride group.

Preferred functional monomers have the general formula

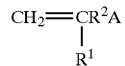

wherein $R^1$ is hydrogen, a $C_1$ to $C_4$ alkyl group, or a phenyl group, preferably hydrogen or a methyl group; $R^2$ is a single bond or a divalent linking group that joins an ethylenically unsaturated group to functional group A and preferably contains up to 34, preferably up to 18, more preferably up to 10, carbon and, optionally, oxygen and nitrogen atoms and, when $R^2$ is not a single bond, is preferably selected from

in which $R^3$ is an alkylene group having 1 to 6 carbon atoms, a 5- or 6-membered cycloalkylene group having 5 to 10 carbon atoms, or an alkylene-oxyalkylene in which each alkylene includes 1 to 6 carbon atoms or is a divalent aromatic group having 6 to 16 carbon atoms; and A is a functional group, capable of reaction with a co-reactive functional group (which is part of an unsaturated monomer) to form a covalent bond, preferably selected from the class consisting of hydroxyl, amino (especially secondary amino), carboxyl, isocyanato, aziridinyl, epoxy, acyl halide, vinyloxy, azlactone, oxazolinyl, acetoacetyl, and cyclic anhydride groups.

Representative hydroxyl group-substituted functional monomers include the hydroxyalkyl (meth)acrylates and hydroxyalkyl (meth)acrylamides such as 2-hydroxyethyl (meth)acrylate, 2-hydroxypropyl (meth)acrylate, 3-chloro-2-hydroxypropylmethyl (meth)acrylate, 2-hydroxyethyl (meth)acrylamide, 4-hydroxycyclohexyl (meth)acrylate, 3-acryloyloxyphenol, 2-(4-acryloyloxyphenyl)-2-(4-hydroxyphenyl)propane (also called bisphenol A monoacrylate), 2-propyn-1-ol, and 3-butyn-1-ol.

Representative amino group-substituted functional monomers include 2-methyl aminoethyl methacrylate, 3-aminopropyl methacrylate, 4-aminocyclohexyl methacrylate, N-(3-aminophenyl)acrylamide, 4-aminostyrene, N-acryloylethylenediamine, and 4-aminophenyl-4-acrylamidophenylsulfone.

Representative azlactone group-substituted functional monomers include 2-ethenyl-1,3-oxazolin-5-one; 2-ethenyl-4-methyl-1,3-oxazolin-5-one; 2-isopropenyl-1,3-oxazolin-5-one; 2-isopropenyl-4-methyl-1,3-oxazolin-5-one; 2-ethenyl-4,4-dimethyl-1,3-oxazolin-5-one; 2-isopropenyl-4,4-dimethyl-1,3-oxazolin-5-one; 2-ethenyl-4-methyl-4-ethyl-1,3-oxazolin-5-one; 2-isopropenyl-3-oxa-1-aza[4.5]spirodec-1-ene-4-one; 2-ethenyl-5,6-dihydro-4H-1,3-oxazin-6-one; 2-ethenyl-4,5,6,7-tetrahydro-1,3-oxazepin-7-one; 2-isopropenyl-5,6-dihydro-5,5-di(2-methylphenyl)-4 H-1,3-oxazin-6-one; 2-acryloyloxy-1,3-oxazolin-5-one; 2-(2-acryloyloxy)ethyl-4,4-dimethyl-1,3-oxazolin-5-one; 2-ethenyl-4,5-dihydro-6H-1,3-oxazin-6-one, and 2-ethenyl-4,5-dihydro-4,4-dimethyl-6H-1,3-oxazin-6-one.

Representative oxazolinyl group-substituted functional monomers include 2-vinyl-2-oxazoline, 2-isopropenyl-2-oxazoline, 2-(5-hexenyl)-2-oxazoline, 2-acryloxy-2-oxazoline, 2-(4-acryloxyphenyl)-2-oxazoline, and 2-methacryloxy-2-oxazoline.

Representative acetoacetyl group-substituted functional monomers include 2-(acetoacetoxy)ethyl(meth)acrylate, styryl acetoacetate, isopropenyl acetoacetate, and hex-5-enyl acetoacetate.

Representative carboxyl group-substituted functional monomers include (meth)acrylic acid, 3-(meth)acryloyloxy-propionic acid, 4-(meth)acryloyloxy-butyric acid, 2-(meth) acryloyloxy-benzoic acid, 3-(meth)acryloyloxy-5-methyl benzoic acid, 4-(meth)acryloyloxymethyl-benzoic acid, phthalic acid mono-[2-(meth)acryloyloxy-ethyl]ester, 2-butynoic acid, and 4-pentynoic acid.

Representative isocyanate group-substituted functional monomers include 2-isocyanatoethyl(meth)acrylate, 3-isocyanatopropyl(meth)acrylate, 4-isocyanatocyclohexyl (meth)acrylate, 4-isocyanatostyrene, 2-methyl-2-propenoyl isocyanate, 4-(2-acryloyloxyethoxycarbonylamino)phenyl-isocyanate, allyl 2-isocyanatoethylether, and 3-isocyanato-1-propene.

Representative epoxy group-substituted functional monomers include glycidyl(meth)acrylate, thioglycidyl(meth)acrylate, 3-(2,3-epoxypropxy)phenyl(meth)acrylate, 2-[4-(2,3-epoxypropoxy)phenyl]-2-(4-acryloyloxy-phenyl) propane, 4-(2,3-epoxypropoxy)cyclohexyl(meth)acrylate, 2,3-epoxycyclohexyl(meth)acrylate, and 3,4-epoxycyclohexyl(meth)acrylate.

Representative aziridinyl group-substituted functional monomers include N-(meth)acryloylaziridine, 2-(1-aziridinyl)ethyl(meth)acrylate, 4-(1-aziridinyl)butyl(meth)acrylate, 2-[2-(1-aziridinyl)ethoxy]ethyl(meth)acrylate, 2-[2-(1-aziridinyl)ethoxycarbonylamino]ethyl(meth)acrylate, 12-[2-(2,2,3,3-tetramethyl-1-aziridinyl)ethoxycarbonylamino] dodecyl(meth)acrylate, and 1-(2-propenyl)aziridine.

Representative acyl halide group-substituted functional monomers include (meth)acryloyl chloride, α-chloroacryloyl chloride, acryloyloxyacetyl chloride, 5-hexenoyl chloride, 2-(acryloyloxy) propionyl chloride, 3-(acryloylthioxy) propionoyl chloride, and 3-(N-acryloyl-N-methylamino) propionoyl chloride.

Representative vinyloxy group-substituted functional monomers include 2-(ethenyloxy)ethyl(meth)acrylate, 3-(ethynyloxy)-1-propene, 4-(ethynyloxy)-1-butene, and 4-(ethenyloxy)butyl-2-acrylamido-2,2-dimethylacetate.

Representative anhydride group-substituted functional monomers include maleic anhydride, acrylic anhydride, itaconic anhydride, 3-acryloyloxyphthalic anhydride, and 2-methacryloxycyclohexanedicarboxylic acid anhydride.

It will be understood in the context of the above description of the first and second oligomers, that the ethylenically-unsaturated monomer possessing a reactive functional group ("reactive monomer") is chosen such that the first and second components are mutually co-reactive so that the first oligomer has-a pendant functional group that is co-reactive with the pendant functional group of the second component. The reactive and co-reactive functional groups form a crosslink between the first and second components by forming a linking group between the electrophilic and nucleophilic functional group pairs, and may include reactions commonly referred to as displacement, condensation and addition reactions, rather than polymerization of ethylenically-unsaturated groups.

While it is within the scope of the invention to employ nucleophile-electrophile combinations that react by displacement of some leaving group and creation of a by-product molecule, the removal of by-products may require an additional processing step. It is preferred that the nucleophile-electrophile combinations react by an addition reaction in which no by-product molecules are created, and the exemplified reaction partners react by this preferred mode. Exemplary combinations include hydroxyl or amino functional groups reacting with azlactone-, isocyanate-, and anhydride-functional groups and carboxyl groups reacting with isocyanate- and oxazoline-functional groups.

To aid in the understanding of this interaction between reactive first and co-reactive second functional groups, Table 1 summarizes some possible combinations of functional groups, using carboxyl and hydroxyl groups as representative examples. Those skilled in the art will readily recognize how other previously described functional groups also can be used to form covalent linking groups.

TABLE I

| Functional group | Co-reactive functional group | Resultant linking group |
|---|---|---|
| carboxyl —COOH | oxazolinyl (R$^{12}$ substituted oxazoline ring) | —CO—C(R$^{12}$)(R$^{12}$)—C(R$^{12}$)(R$^{12}$)—NHC(O)— |
| | aziridinyl (R$^{12}$ substituted aziridine ring with N—) | —COC(R$^{12}$)(R$^{12}$)—C(R$^{12}$)(R$^{12}$)NH— |
| | Epoxy (R$^{12}$—C—C— epoxide) | —COC(R$^{12}$)(R$^{12}$)—C(R$^{12}$)(OH)— |
| hydroxyl —OH | Isocyanato O=C=N— | —OCNH— with =O |
| | acid halide XC(=O)— | —OC(=O)— |
| | Azlactone (R$^{12}$ substituted azlactone, n = 1 or 2) | —OC(=O)—(C(R$^{12}$))$_n$—NHC(=O)— |
| | (thio)epoxy (R$^{12}$—C—C— with G; G = O or S) | —OC(R$^{12}$)(R$^{12}$)—C(R$^{12}$)(G—H)— |

In Table I, each R$^{12}$ is independently hydrogen, an alkyl group having 1 to 4 carbon atoms, or a phenyl group. R$^{13}$ and R$^{14}$ are independently hydrogen or an alkyl group containing from 1 to about 4 carbon atoms, although R$^{13}$ and R$^{14}$ preferably are not both alkyl groups.

Representative examples of free-radically polymerizable polar monomers having at least one ethylenically unsaturated polymerizable group which are copolymerizable with acrylate and functional monomers include strongly polar copolymerizable monomers including but not limited to those selected from the group consisting of substituted (meth)acrylamides, N-vinyl pyrrolidone, N-vinyl caprolactam, acrylonitrile, tetrahydrofurfuryl acrylate, acrylamides, and mixtures thereof, and the like.

The selection of the "other monomers" useful in preparing the functional oligomer(s) (of the first and second components) is such that the ultimate crosslinked material has properties suitable for its application. For example, a pressure sensitive adhesive must have sufficient conformability, tack, and adhesion to form a bond to a substrate at room temperature. One measure of a material's suitability for a particular application is the material's glass transition temperature ($T_g$). While in principle a psa copolymer should have a $T_g$ of −15° C. (258° K) or lower in order to have effective adhesion at room temperature, a hard coat requires a $T_g$ significantly greater than its use temperature. A useful predictor of interpolymer $T_g$ for specific combinations of various monomers can be computed by application of Equation (1) (obtained from W. R. Sorenson and T. W. Campbell's text entitled "Preparative Methods of Polymer Chemistry", Interscience: New York (1968), p. 209).

$$\frac{1}{T_g} = \sum_{n=1}^{1} \frac{W_i}{T_g i} \qquad \text{(Equation 1)}$$

wherein $T_g$=Glass transition temperature in degrees Kelvin for the interpolymer $T_g i$=Glass transition temperature in degrees Kelvin for the homopolymer of the ith monomer $W_i$=Weight fraction of the ith monomer Specific values for $T_g$'s of appropriate homopolymers can be obtained from P. Peyser's chapter in "Polymer Handbook", 3rd edition, edited by J. Brandrup and E. H. Immergut, Wiley: New York (1989), pp. VI-209 through VI-277.

Useful "other monomers" include vinyl monomers such as vinyl acetate, styrenes, and alkyl vinyl ethers; and alkyl methacrylates. Useful "other monomers" may also include various polyunsaturated monomers, including addition products or copolymers or oligomers comprising two different functional monomers (as defined previously) such that the product/copolymer/oligomer exhibits the functionality of both of the constituent starting materials/monomers. Examples of useful polyfunctional compounds include allyl, propargyl and crotyl(meth)acrylates; ethylene di(meth)acylate; 1,6-hexanediol diacrylate (HDDA), trimethylol propane triacrylate; pentaerythritol triacrylate; allyl-2-acrylamido-2,2-dimethyl acetate and the like. Use of minor amounts (e.g. 1 weight percent or less) of such polyunsaturated monomers is useful in controlling the modulus of the resulting polymer, and reducing the viscosity by creating a highly branched polymer.

The first oligomer (and second, if present) may comprise free-radically polymerizable monomer units derived from monomers having pendent fluorinated groups. Such "fluorinated monomers" are used in amounts sufficient to impart the desired degree of low surface energy and/or release properties to the resulting crosslinked composition, and are of the formula:

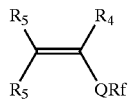

wherein $R_4$ is hydrogen, halogen, or straight chain or branched chain alkyl containing 1 to about 4 carbon atoms;
 each $R_5$ is independently hydrogen or straight chain or branched chain alkyl containing 1 to about 4 carbon atoms;
 each Q is a covalent bond or an organic linking group, such as an alkyleneoxycarbonyl group, or a sulfonamidoalkylene group;
 $R_f$ is a fully or partially fluorinated fluoroaliphatic group, such as —$(CF_2)_3CF_3$. Such fluorinated monomers are described, for example, in Applicant's co-pending application U.S. Ser. No. 09/657,742, filed Sep. 8, 2000.

Useful dendritic polymers (as the second component) have an average functionality (average number of functional groups per molecule) of greater than two and preferably greater than 3. The functional groups are chosen to be co-reactive with the pendant functional groups on the first oligomer, and may be nucleophilic or electrophilic. Useful functional groups include those described for the first oligomer and include, but are not limited to hydroxyl, amino (especially secondary amino), carboxyl, isocyanato, aziridinyl, epoxy, acyl halide, vinyloxy, azlactone, oxazolinyl, acetoacetone, and cyclic anhydride groups. Useful dendritic polymers have the general formula R—$(Z)_n$ where Z is a functional group, n is greater than 1 and R is an organic radical having a valency of n. Preferably R is an alkyl radical of valency n which may be linear or branched. Most preferred functional groups for dendritic polymers are those having hydroxyl, isocyanato, aziridinyl and azlactone functional groups.

Dendritic polymers are preferred and include any of the known dendritic architectures including dendrimers, regular dendrons, dendrigrafts, and hyperbranched polymers. Dendritic polymers are polymers with densely branched structures having a large number of end reactive groups. A dendritic polymer includes several layers or generations of repeating units which all contain one or more branch points. Dendritic polymers, including dendrimers and hyperbranched polymers, can be prepared by condensation, addition, or ionic reactions of monomeric units having at least two different types of reactive groups.

Dendritic polymers are comprised of a plurality of dendrons that emanate from a common core, which core usually comprises a group of atoms. Dendritic polymers generally consist of peripheral surface groups, interior branch junctures having branching functionalities greater than or equal to two, and divalent connectors that covalently connect neighboring branching junctures.

Dendrimers can be prepared by convergent or divergent synthesis. Divergent synthesis of dendrimers involves a molecular growth process which occurs through a consecutive series of geometrically progressive step-wise additions of branches upon branches in a radially outward molecular direction to produce an ordered arrangement of layered branch generations, in which each macromolecule includes a core generation, one or more layers of internal generations, and an outer layer of surface generations, wherein each of the generations includes a single branch juncture. The generations can be the same or different in chemical structure and branching functionality. The surface branch generations may contain either chemically reactive or passive functional groups.

Chemically reactive surface groups can be used for further extension of dendritic growth or for modification of dendritic molecular surfaces. The chemically passive groups may be used to physically modify dendritic surfaces, such as to adjust the ratio of hydrophobic to hydrophilic terminals. Convergent synthesis of dendrimers involves a growth process which begins from what will become the surface of the dendrimers and progresses radially in a molecular direction toward a focal point or core.

Dendrons and dendrimers may be ideal or non-ideal, i.e., imperfect or defective. Imperfections are normally a consequence of either incomplete chemical reactions or unavoidable competing side reactions.

Hyperbranched polymers can be prepared by one-pot polymerization reaction of a single type of monomer having a single reactive group of a first type (B) and a plurality (y) of reactive groups of a second type (A), i.e., a B-$A_y$ type monomer, which is initiated by a core having a plurality (x) of the A type reactive groups, wherein A groups can react with B groups but not other A groups, and B groups cannot react with other B groups. The one-pot synthesis method for hyperbranched polymers is simpler and less expensive than the divergent and convergent synthesis methods for dendrimers. However, the one-pot synthesis method lacks reaction control, which leads to more polydisperse products with larger deviations from the ideal dendron structure.

Hyperbranched polymers are dendritic polymers that contain high levels of non-ideal irregular branching arrays as compared with the more nearly perfect regular structure dendrimers. Specifically, hyperbranched polymers contain a relatively high number of irregular branching arrays in which not every repeat unit contains a branch juncture. Consequently, hyperbranched polymers may be viewed as intermediate between linear polymers and dendrimers. However, they are dendritic because of their relatively high branch-juncture content per individual macromolecule.

The preparation and characterization of dendrimers, dendrons, dendrigrafts, and hyperbranched polymers, is well known. Examples of dendrimers and dendrons, and methods of synthesizing the same are set forth in U.S. Pat. Nos. 4,507,466; 4,558,120; 4,568,737; 4,587,329; 4,631,337; 4,694,064; 4,713,975; 4,737,550; 4,871,779 and 4,857,599. Examples of hyperbranched polymers and methods of preparing the same are set forth, for example, in U.S. Pat. No. 5,418,301. Some dendritic polymers are also commercially available. For example, 2-, 3- and 4-generation hyperbranched polyester polyols may be obtained from Perstorp Polyols, Inc., Toledo, Ohio.

More generally, dendritic polymers or macromolecules are characterized by a relatively high degree of branching (DB), which is defined as the number average fraction of branching groups per molecule, i.e., the ratio of terminal groups plus branch groups to the total number of terminal groups, branch groups and linear groups. For dendrimers, the degree of branching is one. For linear polymers the degree of branching approaches zero. Hyperbranched polymers have a degree of branching that is between that of linear polymers and ideal dendrimers. The dendritic polymers used in this invention preferably have a degree of branching which is at least equal to 0.1, more preferably greater than 0.4, and most preferably greater than 0.5.

Oligomers of the first and second components have relatively low molecular weight, then build molecular weight (and strength) by a step-growth process of the oligomers, through the pendent crosslinkable, reactive functional groups. As result of the relatively low molecular weight, the oligomers are easily processable in operations such as coating, spraying, extrusion and injection molding, because of the low melt viscosity prior to crosslinking, and without the need for solvents, plasticizers or viscosity modifiers. With the present oligomers, the slope of the log-log plot of viscosity vs. molecular weight ($M_n$) is about 1, whereas for high molecular weight polymers the slope is 3.4. The oligomers of the present invention provide processability, then crosslinking of the oligomers provides the needed physical properties such as toughness, hardness, impact resistance and others that are manifested in the cured state. Unless otherwise indicated molecular weight will refer to number average molecular weight.

The molecular weight of the oligomer is less than 100,000, preferably less than 20,000, and more preferably less than 5,000 g/mol. Above this molecular weight the viscosity of the oligomer is such that coating is very difficult without the use of solvents, viscosity modifiers or plasticizers. If desired, higher molecular weight polymers may be blended with lower molecular weight oligomers so that the mixture has a viscosity of 500 to 10,000 cPs at 22° C. Oligomers of the first and second components have a degree of polymerization generally less than about 300. The greater than expected viscosity (for polymers having a degree of polymerization greater than 300), is attributed to entanglements of polymer chains. It has been shown empirically that polymers or oligomers with less than 300 repeat units are not entangled. Prior to the present invention, unentangled polymers have been shown to be processible but they have low strength.

Molecular weight may be controlled through the use of chain transfer agents, including mercaptans, disulfides, carbon tetrabromide, carbon tetrachloride, and others such as are known in the art. Useful chain transfer agents also include cobalt chelates, as described in U.S. Pat. Nos. 4,680,352 and 4,694,054, and oligomeric chain transfer agents as exemplified by

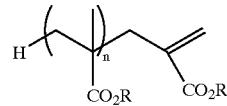

wherein each R is a lower alkyl group or a functional group (as previously described) and n is a number typically less than 10, as described in U.S. Pat. Nos. 5,362,826 and 5,773,534.

As previously described, the composition of the present invention comprises a first oligomer component with a plurality of pendent functional groups, a second component with a plurality of pendent co-reactive functional groups (which may also be either a second oligomer or a dendritic polymer), and optionally a catalyst. The physical form of the composition may be a viscous liquid or low melting solid or a powder, which is related to the glass transition temperature and the molecular weight. The glass transition temperature and molecular weight of the components may be adjusted to obtain compositions having desired properties useful for a myriad of applications ranging from hot-melt adhesives to protective films. Liquid oligomers may be obtained if the glass transition temperature of the oligomer component (or the melting point of the dendritic polymer) is below ambient temperature and the molecular weight of the oligomer component is below entanglement molecular weight (i.e. a degree of polymerization of less than about 300). Low melting solids may be obtained when the Tg is at or below ambient temperature. Powders may be obtained when the Tg is above ambient temperature.

The first oligomer may be prepared (e.g., by solution polymerization followed by isolation) and then combined with a separately prepared second component. Any residual monomer and/or solvents used in the preparation are generally removed by conventional techniques such as distillation, vacuum evaporation, etc. Depending on the type of coating process to be used, the relative amounts of the oligomer(s) or dendritic polymers can vary greatly. The polymerizations may be conducted in the presence of suitable solvents such as ethyl acetate, toluene and tetrahydrofuran that are unreactive with the functional groups of the components of the first and second components.

Polymerization can be accomplished by exposing the component monomers to energy in the presence of a photoinitiator. Energy activated initiators may be unnecessary where, for example, ionizing radiation is used to initiate polymerization. These photoinitiators can be employed in concentrations ranging from about 0.0001 to about 3.0 pbw, preferably from about 0.001 to about 1.0 pbw, and more preferably from-about 0.005 to about 0.5 pbw, per 100 pbw of the composition.

The coatable oligomer composition is prepared by combining the two components containing the first oligomer, the second component and optionally a catalyst. Partial conversion of the two components may be necessary to achieve a thickened solution exhibiting a coatable viscosity of from about 500–10,000 cPs at 22° C., more preferably from about 750 to 7500 cPs.

In general, the order of addition is conducted so as to minimize the reaction between the reactive and co-reactive functional groups prior to coating and thus maximize the useful shelf life or "open time", i.e. the time during which the composition is processed and applied to a substrate. In the case of an adhesive, once the open time has been exceeded, a second substrate cannot be readily bonded to the first substrate. Long open times are generally preferred. Shelf life refers to the amount of time the oligomer composition may be stored without premature gelation.

To avoid premature gelation it is generally advantageous to avoid having both reactive and co-reactive groups on the first oligomer component, or having both reactive and co-reactive groups on the second component. If the reactive and co-reactive groups are not highly reactive, i.e. do not react at appreciable rates at either ambient temperature or in the absence of a step-growth initiator, then one may accommodate the reactive and co-reactive groups on the first oligomer component. Similarly, if the relative concentrations of either the reactive or co-reactive function groups are low, then the two will not react at appreciable rates and gelation may be avoided. However, where the two do react at significant rates, gelation may be avoided by adding one of the components just prior to coating.

As is apparent to one skilled in the art, a portion-wise or sequented additional of the monomers may be deserved in order to effectively incorporated the monomers with different reactivity ratios, or to minimize the premature gellation. For example, in order to prevent premature reaction between hydroxy and azlactone functional groups. The oligomer(s) may be prepared by sequential addition in which a mixture of a monomer containing a reactive functional group and other non-functional group containing monomers, is partially polymerized, then a monomer containing a co-reactive functional group is added, then further polymerizing the mixture.

Alternatively, one or more of the reactive functional groups may be converted to a "protected functional group" to render it temporarily unreactive or blocked. The protective groups may then be removed, either by thermal means, photochemical means, or by means of a selective reagent that reacts with the protective groups, but is otherwise unreactive with other moieties of functional groups in the composition. For example, hydroxyl groups may be converted to trimethylsilyl groups, processed as desired, then the protective trimethylsilyl group released by treatment with a fluoride reagent to allow crosslinking. The selection and use of protective groups is described in *Protective Groups in Organic Synthesis*, T. Greene and P. G. M. Wuts, eds., 3rd edition, Wiley Interscience, N.Y, N.Y, 1999. Thus, at least one of the reactive and co-reactive functional groups may be protected functional groups.

The oligomer composition may be coated onto a substrate at useful and relatively time-stable thicknesses ranging from 25–500 micrometers or more. Stable thicknesses are necessary to maintain the desired coating thickness prior to reaction of the oligomer composition to form the crosslinked composition. Coating can be accomplished by any conventional means such as roller, dip, knife, or extrusion coating.

A preferred method of preparing a crosslinked article comprises partial conversion of the reactive and co-reactive functional groups to form linkages between the first and second components, coating the partially converted oligomer composition onto a substrate (such as a tape backing) and then further conversion of the reactive and co-reactive functional groups to obtain a fully crosslinked material. Partial conversion provides a coatable mixture of the first and second components.

The crosslinked composition is characterized as a polymer having a first oligomer chain having the residue of two or more pendent, functional groups chemically linked to the residue of two or more co-reactive functional groups that are pendent from a second component. At least one of the two components must have greater than two functional groups on average to achieve crosslinking. Preferably each oligomer chain comprises an acrylate oligomer chain. Thus, during exposure to thermal energy, the functional group reacts with a second, co-reactive functional group pendent from a second oligomer chain or dendritic polymer to form a crosslink (linkage) between the chains. The preferable molecular weight between crosslinks ($M_c$) will vary depending on application, where materials having higher ($M_c$) are generally softer. For example, for pressure-sensitive adhesives, the present crosslinked composition has effective molecular weight between crosslinks, ($M_c$), of greater than or equal to 1,000 and preferably greater than 3,000. Effective molecular weight between crosslinks ($M_c$), may be measured by dynamic mechanical analysis.

The number and concentration of pendent functional groups that are pendent from oligomer chains may easily control the degree of crosslinking. In general, the smaller the $M_c$, the lower the elasticity and hence harder the film. On the other hand, films having a lower degree of crosslinking exhibit greater flexibility. Use of a stoichiometric excess of a component containing a functional group or a co-reactive functional group may be useful to achieve control the extent of reaction between the reactive and co-reactive functional groups, under the above specified conditions, and thereby control the $M_c$. Stoichiometric excesses of even 10-fold represent minor amounts on a comparative weight basis relative to the whole composition.

Step-growth catalysts may be used to enhance rates of reaction between reactive and co-reactive functional groups and to effect the crosslinking of the components. Metal catalysts such as dibutyltin dilaurate and dibutyltin diacetate are effective with alcohol-isocyanate combinations. Strong acids such as ethanesulfonic acid, trifluoroacetic acid and methanesulfonic acid are useful with azlactone-alcohols and with the anhydride-alcohols. Effective concentrations of the catalytic agents are from 0.01 to 5.00 weight percent based on the concentration of the stoichiometrically limiting reactant. Strong bases include 1,8-diazabicyclo[5.4.0]undec-7-ene (DBU), 1,5-diazabicyclo[4.3.0]non-5-ene (DBN), and N-methyl-1,5,7-triazabicyclo[4.4.0]dec-5-ene (MeTBD).

In addition to the ingredients mentioned above, the oligomer composition may include certain other materials such as pigments, plasticizers, tackifiers and reinforcing agents. However, the addition of any such material adds complexity and hence expense to an otherwise simple, straightforward, economical composition and process and is not preferred except to achieve specific results.

EXAMPLES

Test Methods

The test procedures used in the following Examples to evaluate and compare the properties of adhesive compositions are industry standard tests. These tests are described in detail in various publications of the American Society for Testing Materials (ASTM), Philadelphia, Pa. and the Pressure Sensitive Tape Council (PSTC), Glenview Ill. References to these standards are also given in the Examples.

Shear Strength Test (ASTM D-3654-78; PSTC-7)

The adhesive films described in the Examples were cut into strips 1.27 cm in width and adhered by their adhesive to flat, rigid stainless steel plates with exactly 2.54 cm length of each adhesive film strip in contact with the plate to which it was adhered. Before testing, a 2200 g weight at 25° C. was rolled twice over the bonded area of each strip. Each of the resulting plates with the adhered film strip was placed either at room temperature (23° C.) or in an air-circulating oven that had been preheated to 70° C. After equilibrating for 15 minutes, a 500 g or 1000 g weight was hung from the free end of the adhered film strip, with the panel tilted 2° from the vertical to insure against any peeling forces. The time (in minutes) at which the weight fell, as a result of the adhesive film strip releasing from the plate by the modes of failure shown below, was the "Shear Strength (min)" at 23° C. (1000 g) or 70° C. (500 g). The test was discontinued at 10,000 minutes if there was no failure. In the Tables, this is designated as 10,000 minutes Mode of Failure (MOF)

The mode of failure of some shear strength tests is indicated as follows:

PP=pop-off: approximately 75–100% adhesive failure from steel plate;

C=Cohesive failure: both the film strip and plate surfaces completely covered by adhesive;

r=residue failure: adhesive covering 100% of film strip with a small residue transferred to panel;

SM=smear: adhesive covering 100% of film strip with a substantial amount (less than 100%) transferred to panel;

FB=failure from backing (film strip): 75–100% adhesive failure from the film strip backing; all adhesive adhered to panel.

The pop-off failure mode is preferred because it is indicative of adhesive failure of the adhesive/steel interfacial bond as opposed to cohesive failure of the adhesive. Adhesives of various shear adhesions, all within the range of the present invention (1–10,000 minutes), are preferred depending on end-use applications.

Two specimens of each tape (adhesive film strip) were tested and the shear strength tests were averaged to obtain the reported shear value.

Peel Adhesion Test [ASTM D 3330-78; PSTC-1 (11/75)]

Peel adhesion was the force required to remove an adhesive-coated test specimen from a test panel measured at a specific angle and rate of removal. In the Examples, this force is expressed in Newtons per decimeter (N/dm) width of coated sheet. The following procedure was used:

(1) A test specimen 25.4 mm wide was applied to a horizontally positioned clean glass test plate. A 2.2 kg rubber roller was used to press a 12.7 mm length of specimen into firm contact with the glass surface.

(2) The free end of the specimen was doubled back, nearly touching itself, so the angle of removal was 180°. The free end was attached to the adhesion tester scale.

(3) The glass test plate was clamped in the jaws of a tensile testing machine which was capable of moving the plate away from the scale at a constant rate of 2.3 meters per minute.

(4) The scale reading in Newtons was recorded as the tape is peeled from the glass surface.

Molecular Weight Measurement (Number Average)

Molecular weight of the oligomers was measured using Gel Permeation Chromatography. Samples were prepared by the addition of 10 ml of tetrahydrofuran (THF) to approximately 25 mg of sample. The solution was filtered using a 0.2 micron PTFE syringe filter. 150 microliters of solution was injected into a six column set (Jordi Associates mixed bed and 500 A columns, Jordi Associates Inc., Bellingham, Mass.) in combination with a Waters 2690™ Separation Module (Waters Corp., Milford, Mass.). The 2690™ operated at room temperature, using THF as the eluent, flowing at a rate of 1.0 ml/min. Changes in concentration were detected by a HP 1047 A refractive index detector (Hewlett Packard Instruments, Palo Alto, Calif.). The molecular weight calculations were based upon a calibration made of narrow dispersity polystyrenes ranging in molecular weight from 6.30E6 to 266. The actual calculations were completed with Caliber™ software (Polymer Laboratories, Inc., Amherst, Mass.).

Probe Tack Test

A probe tack test as described by ASTM D2979-88 was used to evaluate the tackiness of the materials. The material to be tested was placed on the test probe area of a TMI Polyken™ Probetack™ (Model 80-02-01), commercially available from Testing Machines Inc., Amityville, N.Y. with a pressure of 100 g/cm$^2$. The probe head speed was 1 cm/sec, time of contact was 1 sec, and probe withdrawal speed was 1 cm/sec. The test was initiated with at least ten determinations taken at random points. The average peak value was recorded in grams.

Percent Gel Test [ASTM D 3616-82]

The percent gel is used as an indication of cure level. Adhesives containing tackifying resins are corrected to the actual percent gel. The corrected percent gel is 100 times the gelled mass divided by the total mass of material that is capable of forming a gelled network. Soluble materials such as tackifiers are subtracted out when determining the gel fraction.

Crosslinking by radiation improves the creep and shear resistance of adhesives. The transition from a cohesive to an adhesive failure during peeling advances to a lower peel rate and higher temperature with increasing crosslinking density.

Many important properties of crosslinked adhesives vary with the gel content. Hence, determination of the gel content provides a means for controlling the process and thereby raising the quality of the adhesive.

Extraction tests permit verification of the proper gel content of adhesives and they also permit comparison between different crosslinked adhesives and their specific end uses.

Gel Content Determination

A square test specimen (3.81 cm×3.81 cm) containing approximately 0.06 g of adhesive was cut from the tape and placed in a 120-mesh stainless steel basket measuring approximately 4 cm$^3$. The contents are weighed to the nearest 0.1 mg and then immersed in a capped beaker containing sufficient toluene to cover the specimen. After extraction for 24 to 48 hours, the basket (containing the specimen) is removed, drained, and placed in an oven at 93° C. The basket and specimen are dried to a constant weight and the gel content is determined as follows:

$$\text{Extract \%} = \frac{\text{Weight lost during extraction}}{\text{Weight of original specimen}} \times 100$$

For the tackified adhesives, the weight of the resin was subtracted before calculating the corrected gel content as follows:

$$\text{Extract \%} = \frac{\text{Weight lost during extraction} - \text{weight of resin}}{\text{Total weight} - \text{Weight of resin}} \times 100$$

Corrected gel content = 100 − Extract %

Two specimens of each tape were tested and the results were averaged to obtain the gel content value.

Unless otherwise specified, all chemicals and reagents were obtained from Aldrich Chemical Co., Milwaukee, Wis.

EXAMPLES

Examples 1–3

These examples describe the preparation of azlactone-functional oligomers of varying molecular weight.

In a glass polymerization bottle were charged 80 g isooctyl acrylate (IOA), 15 g isobornyl acrylate (IBA), 5 g of vinyl dimethyl azlactone (VDM, 2-ethenyl-4,4-dimethyl-1,3-oxazolin-5-one, from SNPE, Inc., Princeton, N.J.), 100 g ethyl acetate, 0.5 g dibenzoyl peroxide, and carbon tetrabromide (CTB) in varying amounts to prepare oligomers of varying molecular weights, as noted below. The bottle was purged with nitrogen, sealed, and tumbled in a water bath maintained at 60° C. for 12 hrs. Oligomer samples of three number average molecular weights ($M_n$) were prepared (oligomer IA, IB, and IC). See Table 1.

TABLE 1

$M_n$ of IOA/IBA/VDM 80/15/5 Oligomers with Various CTB Levels

| Example | Oligomer Designation | Carbon Tetrabromide (g) | Oligomer $M_n$ |
|---|---|---|---|
| 1 | IA | 0.5 | 99,000 |
| 2 | IB | 1.0 | 68,000 |
| 3 | IC | 1.5 | 28,000 |

Examples 4–6

These examples describe the preparation of hydroxyl-functional polymers of varying molecular weight.

In a glass polymerization bottle were charged 85 g IOA, 15 g IBA, 5 g hydroxyethyl methacrylate (HEMA), 10 g ethyl acetate, 0.5 g dibenzoyl peroxide, and carbon tetrabromide in varying amounts to prepare oligomers of varying molecular weights, as noted below. The bottle was purged with nitrogen, sealed, and tumbled in a water bath maintained at 60° C. for 12 hrs. Oligomer samples of three number average molecular weights ($M_n$) were prepared (oligomer IIA, IIB, and IIC). See Table 2.

TABLE 2

$M_n$ of IOA/IBA/HEMA 85/15/5 Oligomers with Various CTB Levels

| Example | Oligomer Designation | Carbon Tetrabromide, g | Oligomer $M_n$ |
|---|---|---|---|
| 4 | IIA | 0.5 | 84,000 |
| 5 | IIB | 1.0 | 59,000 |
| 6 | IIC | 1.5 | 22,000 |

Examples 7–15

The oligomers in the above examples can be cured by thermal reaction in the presence of base.

1:1 (by weight) mixtures of oligomer solutions from Example 1–3 and Examples 4–6 were mixed with 0.5 wt % of 1,8-diazabicyclo{4.3.0}undec-7-ene (DBU) and coated onto 40 μm poly(ethylene terephthalate) film (PET) at a thickness without solvent of 40 μm, and subjected to 80° C. heating for 5 minutes under nitrogen blanket. Adhesive properties of the resulting crosslinked polymers are shown in Table 3.

TABLE 3

Adhesive Properties of Non-Polar Crosslinked Reactive Polymers

| Example | Polymer Composition | Peel Adhesion (N/dm) | Shear Strength (min) at 23° C. | Mode of Failure |
|---|---|---|---|---|
| 7 | IA/IIA | 38 | 2240 | ND |
| 8 | IA/IIB | 32 | 1150 | pp |
| 9 | IA/IIC | 26 | 105 | pp |
| 10 | IB/IIA | 34 | 680 | ND |
| 11 | IB/IIB | 33 | 1567 | pp |
| 12 | IB/IIC | 29 | 24 | pp |
| 13 | IC/IIA | 36 | 8400 | ND |
| 14 | IC/IIB | 22 | 389 | pp |
| 15 | IC/IIC | 12 | 22 | pp |

ND = not determined

The data of Table 3 show that the crosslinking reactions of reactive oligomers of the invention provided adhesives having good peel and shear strength. The pop-off failure of samples was indicative of a high degree of crosslinking.

Examples 16–21

These examples exhibit the control of crosslinking density through dilution of reactive functionalities, based on inclusion of a monofunctional oligomeric entity.

In a glass polymerization bottle were charged 80 g IOA, 20 g IBA, 0.5 g 2-mercaptoethanol, 100 g ethyl acetate, and 0.2 g azobis(isobutyronitrile) (AIBN). The bottle was purged with nitrogen, sealed, and tumbled in a water bath maintained at 60° C. for 14 hrs. Hydroxy terminated IOA/IBA oligomer was isolated from the resulting reaction mixture by precipitation in methanol. The number average molecular weight of the oligomer was $M_n$=24,000 (oligomer III). The number average molecular weight of the oligomer was $M_n$=24,000. Various percentages of the hydroxyl end-functional oligomer were mixed with selected oligomer compositions of Examples 7–15 with 0.5% DBU. The mixtures were coated onto PET liner, the solvent was removed from the coatings, and the coatings were crosslinked as described in Examples 7–15. Properties of the resulting crosslinked oligomers are shown in Table 4.

TABLE 4

Adhesive Properties of Crosslinked Reactive Oligomers with Acrylamido-Functional Oligomer.

| Example | Oligomer Composition | Oligomer III Amount (phr) | Peel Adhesion (N/dm) | Shear Strength (min) at 23° C. | Mode of Failure |
|---|---|---|---|---|---|
| 9 | IA/IIC | 0 | 26 | 105 | pp |
| 16 | IA/IIC | 5 | 32 | 1150 | pp |
| 17 | IA/IIC | 10 | 36 | 5042 | ND |
| 12 | IB/IIC | 0 | 29 | 24 | pp |
| 18 | IB/IIC | 5 | 33 | 507 | pp |
| 19 | IB/IIC | 10 | 39 | 2048 | pp |
| 15 | IC/IIC | 0 | 12 | 22 | pp |
| 20 | IC/IIC | 5 | 22 | 498 | pp |
| 21 | IC/IIC | 10 | 28 | 1150 | pp |

ND = not determined

The data of Table 4 show that addition of a low-$M_n$ hydroxy-functional oligomer III diluted the crosslink density of the crosslinked reactive oligomers of the invention. The effect was more pronounced in Examples 17 and 19. Example 15 had the highest crosslink density as evident from the low peel adhesion value. Addition of oligomer III to Example 15 greatly enhanced the peel adhesion and shear properties.

Examples 22–23

These examples describe the mixing of azlactone-functional polymer and oligomer(s) to provide a coatable, curable composition.

In a glass polymerization bottle were charged 80 g IOA, 18 g IBA, 2 g VDM, 100 g ethyl acetate, and 0.5 g dibenzoyl peroxide. The bottle was purged with nitrogen, sealed, and tumbled in a water bath maintained at 60° C. for 14 hrs. The resulting terpolymer, IOA/IBA/VDM, was isolated by precipitation in petroleum ether. The terpolymer had a number average molecular weight of 175,000 (polymer IV). This high molecular weight polymer having a pendent azlactone moiety was mixed with the low molecular weight oligomer composition used in Example 15, coated onto a PET liner, and subjected to 80° C. to affect crosslinking, as described in Examples 7–15. Properties of the resulting crosslinked polymer are shown in Table 5.

Examples 24–25

Similarly, these examples describe the mixing of hydroxyl-functional polymer and oligomer to provide a coatable, curable composition.

In a glass polymerization bottle were charged 80 g IOA, 18 g IBA, 2 g HEMA, 100 g ethyl acetate, and 0.5 g dibenzoyl peroxide. The bottle was purged with nitrogen, sealed, and tumbled in a water bath maintained at 60° C. for 14 hrs. The resulting terpolymer, IOA/IBA/HEMA, was isolated by precipitation in petroleum ether. The terpolymer has a number average molecular weight of 180,000 (polymer V). This high molecular weight polymer having a pendent hydroxyl moiety was mixed with the low molecular weight oligomer composition used in Example 15 in Table 4, coated onto a PET liner, and subjected to 80° C. to affect crosslinking, as in Examples 7–15. Properties of the resulting crosslinked polymer are shown in Table 5.

TABLE 5

Adhesive Properties of Crosslinked Reactive Oligomers with Polymers IV and V.

| Example | Oligomer Composition | Polymer IV or V Amount (phr) | Peel Adhesion (N/dm) | Shear Strength (min) 23° C. | Mode of Failure |
|---|---|---|---|---|---|
| 15 | IC/IIC | 0 | 12 | 22 | pp |
| 22 | IC/IIC | 5 with IV | 20 | 1050 | pp |
| 23 | IC/IIC | 10 with IV | 28 | 3150 | pp |
| 24 | IC/IIC | 5 with V | 19 | 705 | pp |
| 25 | IC/IIC | 10 with V | 30 | 4550 | pp |

The data of Table 5 show that dilution of crosslink density by a co-reactive, high molecular weight diluent significantly increased the peel adhesion and high temperature shear strength of crosslinked, low molecular weight reactive oligomers. Thus, the ultimate properties of the materials can be adjusted through modification of the molecular weights and functional groups in polymers IV and V.

Examples 26–28

Oligomers comprising pendent hydroxyl groups were prepared for evaluation in making crosslinked polymers for clear coats. Thus, a solution of n-butylacrylate (nBA), n-butylmethacrylate (nBMA), styrene (St), methyl methacrylate (MMA), and 2-hydroxyethyl methacrylate (HEMA) was prepared at 50% solids in 100 g xylene, then mixed with approximately 5 weight % peroxide initiator (ethyl 3,3-di(t-amylperoxy)butyrate). The reaction mixture was heated at 135–140° C. for 10 hr. The resulting reactive oligomers (VIA, VIB, and VIC) are described in Table 6.

TABLE 6

Oligomers with Pendent Hydroxyl Groups for Clear Coats.

| Example | Oligomer | nBA (g) | nBMA (g) | St (g) | MMA (g) | HEMA (g) | $M_n$ | PD |
|---|---|---|---|---|---|---|---|---|
| 26 | VIA | 15 | 15 | 30 | 35 | 5 | 3200 | 3.4 |
| 27 | VIB | 15 | 25 | 30 | 30 | 10 | 3400 | 3.2 |
| 28 | VIC | 10 | 15 | 30 | 30 | 15 | 2800 | 3.8 |

PD means polydispersity.

Examples 29–30

In a manner similar to that described in Examples 26–28, copolymers were prepared in which the HEMA monomer was replaced by vinyl dimethyl azlactone (VDM) monomer, to prepare oligomers containing azlactone pendant units. The resulting oligomers (VIIA and VIIB) are described in Table 7.

TABLE 7

Oligomers with Pendent Azlactone Groups.

| Example | Oligomer | nBA (g) | nBMA (g) | St (g) | MMA (g) | VDM (g) | $M_n$ | PD |
|---|---|---|---|---|---|---|---|---|
| 29 | VIIA | 15 | 15 | 30 | 35 | 5 | 3400 | 4.0 |
| 30 | VIIB | 15 | 15 | 30 | 38 | 10 | 2800 | 3.6 |

PD means polydispersity.

Example 31

Equal weight mixtures of oligomers VIA/VIIA, VIIB/VIIB, and VIC/VIIB were prepared containing 0.2 wt. % of DBU. The resulting mixtures were coated on glass slides and dried at 150° C. for 10 minutes to obtain a crosslinked film of 25 micron thickness. The resulting polymer films exhibited excellent solvent resistance to MEK even after 100 rubs (ASTM D 5402-93). Thus, these materials provide solvent-resistant clear coat films.

The following three examples describe the preparation of oligomers suitable for powder coating applications.

Example 32

In a glass polymerization bottle were charged 24 g isooctyl acrylate (IOA), 76 g isobornyl acrylate (IBA), 5 g of vinyl dimethyl azalactone (VDM), 100 g ethyl acetate, 0.5 g dibenzoyl peroxide, and 5 g of triethylsilane. The bottle was purged with nitrogen, sealed, and tumbled in a water bath maintained at 60° C. for 20 hrs. The resulting oligomer was concentrated and precipitated in n-hexane, and was ground to fine powder. The number average molecular weight of was 18,000 (Oligomer VIII)

Example 33

In a glass polymerization bottle were charged 24 g isooctyl acrylate (IOA), 76 g isobornyl acrylate (IBA), 5 g hydroxyethyl methacrylate (HEMA), 100 g ethyl acetate, 0.5 g dibenzoyl peroxide, and 5 g of triethylsilane. The bottle was purged with nitrogen, sealed, and tumbled in a water bath maintained at 60° C. for 20 hrs. The resulting oligomer was concentrated and precipitated in n-hexane, and ground to fine powder. The number average molecular weight of was 17,000 (oligomer IX)

Example 34

Crosslinked copolymers were also prepared from mixtures of the reactive oligomers VIII and IX of Examples 32 and 33. An equal-weight mixture of oligomers VIII and IX in fine powder form was prepared, mixed thoroughly along with 0.2 wt % (based on the total weight of the oligomers) of DBU and coated electrostatically on stainless steel coupons to a thickness of 1 mil and heated at 120° C. for 15 minutes. The resulting crosslinked polymer was a clear thin coating and exhibited good resistance to methyl ethyl ketone (MEK) even after 100 rubs (ASTM D5402-93).

Examples 35–40

Adhesives can also be prepared from standard oligomers by direct addition of plasticizer, as described in the following examples.

A stock solution of a coating composition was prepared by dissolving 50 g of oligomer VIII from Example 32, 50 g of oligomer IX from Example 33, and 0.2 g of DBU in 100 g of methyl ethyl ketone. Several different formulations were prepared with varying amounts of Citroflex A-4 plasticizers (Morflex Inc., North Carolina) were mixed with 10 g quantities of the stock solution, and the resulting mixtures coated on a 2 mil polyester backing to a thickness of 1.5 mils. The resulting coatings were heated at 120° C. for 5 minutes for crosslinking to occur. Characterization of the resulting crosslinked coatings is summarized in Table 8.

TABLE 8

Crosslinked Coatings Made with Oligomers VIII and IX without and with Plasticizer.

| Example | Plasticizer (phr) | Peel Adhesion (N/dm) | Shear Strength (min) | Mode of Failure |
|---|---|---|---|---|
| 35 | 0 | no tack | NA | NA |
| 36 | 0.5 | 8 | 2 | pp |
| 37 | 1.0 | 15 | 28 | pp |
| 38 | 2.0 | 32 | 155 | pp |
| 39 | 3.0 | 42 | 750 | pp |
| 40 | 4.0 | 56 | 33 | C |

NA means not applicable.

The data in Table 8 reveals that the plasticizer was compatible with the oligomers, and that adhesives with adequate peel adhesion and moderate shear strength were derived from this method.

The stock solution on standing gelled in 2 hrs. It is desirable to find conditions to prepare solutions stable over an extended period of time.

The following four examples describe a method of preventing gelation through controlled activation of the catalyst.

Example 41

A coating composition was prepared by combining 5 g of oligomer VIII from Example 32, 5 g of oligomer IX from Example 33, 10 g of methyl ethyl ketone, 0.02 g of acetic acid, and 0.02 g of DBU. As a comparison, the same coating composition was formulated without the acetic acid. The coating compositions were tested for gel time at ambient temperature. The gel time was reported as the time taken when the mixture no longer flowed from the bottle. The test sample did not gel for 10 days while the comparative example (no acetic acid) gelled in less than an hour. The test sample upon heating at 120° C. for 15 minutes gave crosslinked polymer.

Example 42

The coating composition in Example 41 was repeated by replacing acetic acid with benzoic acid. The mixture did not gel for a week upon standing at room temperature.

Example 43

In a glass polymerization bottle were charged 24 g isooctyl acrylate (IOA), 76 g isobornyl acrylate (IBA), 4.5 g hydroxyethyl methacrylate (HEMA), 0.5 g acrylic acid, 100 g ethyl acetate, 0.5 g dibenzoyl peroxide, and 5 g of triethylsilane. The bottle was purged with nitrogen, sealed, and tumbled in a water bath maintained at 60° C. for 20 hrs. Oligomer was concentrated and precipitated in n-hexane. The solid oligomer was ground to fine powder. The number average molecular weight of was 17,500 (oligomer X).

Example 44

A coating composition was prepared by combining 5 g of oligomer X from Example 43, 5 g of oligomer IX from Example 33, 10 g of methyl ethyl ketone, and 0.02 g of DBU. The resulting solution did not gel upon standing at ambient temperature for 8 hours. The solution was coated on a 2 mil polyester backing and heated at 120° C. for 15 minutes. The resulting film was insoluble in MEK indicating crosslinking.

While azlactone-hydroxyl reactions are useful for these types of crosslinking formulations, alternative chemistries can also be used. The following eight examples describe one such alternative chemistry, based on methacryloyloxyethyl-carbamoyl-ethylmethylketonoxime.

Example 45

Preparation of Methacryloyloxyethylcarbamoyl-ethylmethylketonoxime

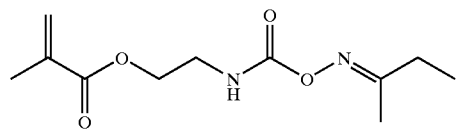

To a solution of 2-isocyanatoethylmethacrylate (IEM, 43.44 g, 0.28 mol) in tetrahydrofuran (100 mL) was added 2-butanone oxime (24.35 g, 0.28 mol) dropwise over 30 minutes at room temperature. After two hours, the solvent was removed under vacuum to give a clear liquid.

Example 46

In a glass polymerization bottle were charged 50 g isooctyl acrylate (IOA), 45 g isobornyl acrylate (IBA), 5 g methacryloyloxycarbamoyl-ethylmethylketonoxime, 100 g ethyl acetate, 0.5 g dibenzoyl peroxide, and 5 g of triethylsilane. The bottle was purged with nitrogen, sealed, and tumbled in a water bath maintained at 60° C. for 20 hrs. The resulting oligomer had a number average molecular weight of 18,000 (oligomer XI).

Example 47

In a clear glass polymerization jar were charged 50 g isooctyl acrylate (IOA), 45 g isobornyl acrylate (IBA), 5 g methacryloyloxycarbamoyl-ethylmethylketonoxime, 100 g ethyl acetate, 0.4 g Irgacure 651, and 5 g of triethylsilane. The bottle was purged with nitrogen, sealed, and exposed to UV radiation (General Electric and Sylvania F40BL-Black Light, 12.5 cm from source, emission between 310–430 nm with peak emission at 380 nm) for 20 hrs. The resulting oligomer had a number average molecular weight of 21,000 (oligomer XII).

Example 48

In a glass polymerization bottle were charged 50 g isooctyl acrylate (IOA), 40 g isobornyl acrylate (IBA), 5 g methacryloyloxycarbamoyl-ethylmethylketonoxime, 5 g hydroxyethyl methacrylate 100 g ethyl acetate, 0.5 g benzoyl peroxide, and 5 g of triethylsilane. The bottle was purged with nitrogen, sealed, and tumbled in a water bath maintained at 60° C. for 20 hrs. The resulting oligomer had a number average molecular weight of 22,500 (oligomer XIII). Despite the presence of complimentary functional groups in the oligomer, there was no gelation. The oligomer was cast into a film on an aluminum pan and heated at 120° C. for 10 minutes. The oligomer had no tack, and the film was brittle.

Example 49

In a clear glass polymerization jar were charged 50 g isooctyl acrylate (IOA), 40 g isobornyl acrylate (IBA), 5 g methacryloyloxycarbamoyl-ethylmethylketonoxime, 5 g hydroxyethyl methacrylate 100 g ethyl acetate, 0.4 g Irgacure 651, and 5 g of triethylsilane. The bottle was purged with nitrogen, sealed, and exposed to UV radiation (General Electric and Sylvania F40BL-Black Light, 12.5 cm from source, emission between 310–430 nm with peak emission at 380 nm) for 20 hrs. The number average molecular weight of the resulting oligomer was 18,500 (oligomer XIV). Despite the presence of complimentary functional groups in the oligomer, there was no gelation. The oligomer was cast into a film on an aluminum pan and heated at 120° C. for 10 minutes. The polymer had slight tack, and the film was clear and flexible.

The physical appearance of the crosslinked films in Examples 49 and 50 suggested that despite similar composition of monomers in the oligomers, products obtained under thermal and photochemical processes were different. Polymers produced by photochemical methods may thus be flexible, while comparable materials prepared thermally are not necessarily identical.

Examples 50–52

Several coating compositions were prepared, by mixing different proportions of oligomer XI from Example 46 and oligomer XII from Example 47, and coated on a polyester backing (50.8 microns thick) to a thickness of 38.1 microns. The samples were heated at 120° C. for 10 minutes for crosslinking to occur. The resulting crosslinked coatings are described in Table 9.

TABLE 9

Crosslinked Coatings of Mixtures of Oligomers XI and XII.

| Example | Oligomer XI (g) | Oligomer XII (g) | Solubility in MEK | Physical Appearance |
|---|---|---|---|---|
| 49 | 7 | 3 | Insoluble | Clear, slight tack |
| 50 | 5 | 5 | Insoluble | Clear, no tack |
| 51 | 3 | 7 | Insoluble | Clear, slight tack |

The data in Table 9 show that Example 51 had no tack, indicating high crosslinking density in the coating.

Example 53

Fluorinated materials are useful for controlling surface energy of coatings. Reactive oligomers containing perfluorobutyl chains were thus prepared and crosslinked, as described in the following six examples.

A solution of 70 g N-methyl perfluorobutylsulfonamidoethyl acrylate (MeFBSEA, $CH_2=CHCOOCH_2CHNMeSO_2C_4F_9$, described in Japanese Kokai Publication 57/193580, p. 5), 30 g dimethylaminoethyl acrylate (DMAEA), 4.0 g VDM, 0.5 g dibenzoyl peroxide, and 0.5 g IOTG chain transfer agent in 100 g ethyl acetate was tumbled in a polymerization bottle in a 60° C. water bath for 14 hours. On removal of solvent, a reactive oligomer comprising pendant azlactone units having an $M_n$ of 19,000 was obtained.

Example 54

In a manner similar to that described in Example 53, a terpolymer was prepared from 70 g MeFBSEA, 30 g DMAEA, and 4 g HEMA. On removal of solvent, a reactive oligomer comprising pendent hydroxyl units was obtained, having an $M_n$ of 22,000.

Example 55

A mixture of 300 g N-methyl perfluorobutylsulfonamidoethyl alcohol (MeFBSE-OH, $C_4F_9SO_2N(CH_3)CH_2CH_2OH$, prepared in two stages by reacting perfluorobutylsulfonamidofluoride with methylamine and ethylenechlorohydrin, using a procedure essentially as described in Example 1 of U.S. Pat. No. 2,803,656 (Ahlbrecht, et al.) and 480 gamma-caprolactone was heated to 160° C. under nitrogen. Dibutyltin dilaurate (600 mg) was added, and the mixture was stirred at 160° C. for 6 h. After cooling to room temperature, the desired perfluorinated caprolactone alcohol was obtained as a tan solid having a hydroxyl equivalent weight of 755. A mixture of 50 g of the alcohol, 9.2 g vinyl dimethylazlactone, and 0.1 g DBU was heated to 65 C for 24 h. After cooling to room temperature, a waxy solid corresponding to the desired N-methyl perfluorobutylsulfonamidoethyl caprolactone acrylamide (MeFBS(cap)Ac) was obtained.

Example 56

In a manner similar to that described in Example 53, a terpolymer was prepared from 70 g MeFBS(cap)Ac, 30 g DMAEA and 4.0 g vinyl dimethyl azlactone. On removal of solvent a reactive oligomer comprising pendant azlactone units was obtained having a $M_n$ of 23,000.

Example 57

In a manner similar to that described in Example 53, a terpolymer was prepared from 70 g MeFBS(cap)A, 30 g DMAEA, and 4 g HEMA. On removal of solvent, a reactive oligomer comprising pendent hydroxyl units was obtained, having a $M_n$ of 25,000.

Example 58

Crosslinked compositions containing the perfluorobutyl groups as described in Examples 53–57 were prepared by mixing equal-weight portions of reactive oligomers in the presence of 5 wt % of DBU (based on the total concentration of reactive polymers). The oligomer solutions were coated on a poly(ethyleneterephthalate) film at approximately 40 microns thickness and heat cured at 120° C. for 5 minutes. Water and hexane repellency for the crosslinked oligomers as well as for the reactive oligomers was measured using a Model 322 Dynamic Contact Angle Analyzer (Cahn Instruments, Madison, Wis.). Sample plates required for contact angle measurements using the Wilhelmy technique (L. Wilhelmy, Ann. Physik, 119 (1863) 177) were prepared by bonding two 24 mm wide strips of the coating together (back to back) so that only the coating surface was presented to the test liquid. Advancing and receding contact angles were measured at 3–5 different regions of the surface of the Wilhelmy plate. Results are shown in Table 10.

TABLE 10

Contact angles of fluorinated coatings.

| Sample | Composition | Water AC/RC | Hexane AC/RC |
|---|---|---|---|
| 57-1 | Ex. 54 | 96/76 | 66/54 |
| 29-2 | Ex. 55 | 96/73 | 69/51 |
| 29-3 | Exs 54 + 55 | 100/94 | 82/70 |
| 29-4 | Ex. 57 | 94/48 | 62/43 |
| 29-5 | Ex. 58 | 92/46 | 59/44 |
| 29-6 | Exs. 57 + 58 | 99/67 | 74/50 |

AC = advancing contact angle, RC = receding contact angle.

The data of Table 10 show that crosslinked oligomers comprising perfluorobutyl groups can be easily prepared and the polymers exhibit improved advancing and receding contact angles for water droplets over their non-crosslinked constituent reactive oligomers. Slight improvement in contact angles for hexane was also observed.

Example 59

Functional oligomers of this type can also be formed into foams through appropriate additives, as described in the following example. Reactive oligomer from Example 4 (oligomer IIA) and Example 1 (oligomer IA) were mixed in equal proportions (w/w) along with 2 weight percent of expandable polymeric microspheres having a shell composition containing acrylonitrile and methacrylonitrile (Expancel™ 091, Akzo Nobel Chemicals, Inc., Stratford, Conn.). The mixture was coated onto a 50 micron biaxially-oriented poly(ethylene terephthalate) (PET) film at a thickness of 125 micron. The film was heated at 120° C. for 10 minutes for curing and expanding the microspheres. The resulting adhesive had a peel adhesion of 23 N/dm and shear strength of about 1000 minutes at 23° C.

Example 60

Crosslinked compositions with low tack can be of use in particular applications. Compositions with these properties are described in the following three examples. In a glass polymerization bottle were charged 72 g IOA, 18 g octadecyl acrylate (ODA), 10 g HEMA, 150 g ethyl acetate, and 0.4 g VAZO-67 (Wako). The bottle was purged with nitrogen, sealed, and tumbled in a water bath maintained at 60° C. for 16 hrs. The resulting terpolymer, IOA/ODA/HEMA, was isolated by precipitation in petroleum ether. The terpolymer (polymer XIII) has a number average molecular weight of 26,000.

Example 61

In a glass polymerization bottle were charged 72 g IOA, 18 g octadecyl acrylate (ODA), 10 g VDM, 150 g ethyl acetate, and 0.4 g VAZO-67 (Wako). The bottle was purged with nitrogen, sealed, and tumbled in a water bath maintained at 60° C. for 16 hrs. The resulting terpolymer, IOA/ODA/VDM, was isolated by precipitation in petroleum ether. The terpolymer (polymer XIV) has a number average molecular weight of 26,000.

Example 62

Reactive oligomers from Examples 60 and 61 were mixed in different proportions and coated onto a 50 micron biaxially-oriented poly(ethylene terephthalate) (PET) film at a thickness of 50 micron. The films were heat cured at 100° C. for 10 minutes. The tapes were analyzed for peel adhesions. The results are summarized in Table 11.

TABLE 11

Adhesion of low tack compositions.

| Sample | Oligomer XIII | Oligomer XIV | Peel adhesion (N/dm) |
|---|---|---|---|
| 61a | 80 | 20 | 0.38 |
| 61b | 20 | 80 | 0.35 |

The data clearly show that the peel adhesions are low and are invariant with the composition. Further, these compositions with low peel adhesions may be useful for applications as repositionable adhesives or as release liners.

Example 63

Materials with a high degree of branching are of much interest, as the degree of branching has a strong influence on processability and crosslink density. The following two examples describe the use of hyperbranched polymers with reactive oligomers.

A mixture of 200 g of a 3-generation hyperbranched polyester polyol, nominal molecular weight of 3570; and OH functionality of 32 available under the trade name BOLTORN H30 (from Perstorp Polyol Inc., Toledo, Ohio) and 1% of p-toluenesulfonic acid was placed in a 3-necked reactor equipped with a stirrer and a nitrogen gas inlet. The reactor was heated to 140° C. until the polymer melted (Malmstrom, E. Johansson. M., and Hult, A., Macromolecules, 28, 1698–1703 (1945)) To the continously stirred molten polymer was added 25 weight % of octanoic acid, representing 10 mole % of the polymer's free hydroxyl groups. The mixture was left to react with continuous stirring and frequent addition of xylene to facilitate azeotropic water removal. A continuous nitrogen stream was blown through the reactor throughout the reaction time to facilitate the removal of the xylene/water azeotrope. After 2 hours of reaction, the nitrogen was turned off and the reactor was connected to a vacuum to remove any volatile components. The resulting material is a viscous liquid at room temperature. An approximate yield 100% yield was obtained.

Example 64

Hyperbranched oligomer of example 63 was blended with oligomer IC in a 50–50 weight ratio. A thin polymer coating was obtained on a release liner. The film heated at 100° C. in the presence of DBU. The film is clear and is insoluble in toluene indicative of crosslinking. The polymer properties may be tailored for applications in coatings and adhesives by varying the type and concentration of alkyl groups on the hyperbranched polymers.

The following examples describe the preparation of materials containing both nucleophilic and electrophilic functional groups, suitable for crosslinking. These linear or branched materials are prepared by the sequential addition of functional monomers.

Example 65

A multifunctional reactive oligomer was prepared by polymerizing 76 parts isooctyl acrylate (IOA), 19 parts isobornyl acrylate (IBA), and 2.5 parts 2-hydroxyethylacrylate (HEA) in ethyl acetate, where ethyl acetate was 70% of the total weight of the solution. The mixture also contained 0.2% by weight VAZO-52 as initiator, and carbon tetrabromide as a chain transfer agent. The reaction was carried out for 2 hours at 60° C. under nitrogen, at which time 2.5 parts of vinyldimethylazlactone were added. The reaction was continued for 1.5 hours at 60° C. under nitrogen. The resulting oligomer formed a gel upon addition of 1,8-diazobicyclo[5.4.0]undec-7-ene (DBU).

Example 66

A multifunctional reactive oligomer was prepared by polymerizing 76 parts isooctyl acrylate (IOA), 19 parts isobornyl acrylate (IBA), and 2.5 parts 2-hydroxyethylacrylate (HEA) in ethyl acetate, where ethyl acetate was 70% of the total weight of the solution. The mixture also contained 0.2% by weight Irgacure 184 as initiator, and carbon tetrabromide as a chain transfer agent. The reaction was carried out by exposure to UV radiation (General Electric and Sylvania F40BL-Black Light, 12.5 cm from source, emission between 310–430 nm with peak emission at 380 nm) under nitrogen for 2 hours, at which time 2.5 parts of 2-vinyl-4,4-dimethylazlactone were added. The reaction was continued for 1.5 hours by exposure to UV radiation under nitrogen. The resulting oligomer formed a gel upon addition of 1,8-diazobicyclo[5.4.0]undec-7-ene (DBU).

Example 67

A multifunctional branched oligomer was prepared by polymerizing 76 parts isooctyl acrylate, 19 parts of isobornyl acrylate, 1 part of 1,6-hexanediol diacrylate, and 2.5 parts of 2-hydroxyethyl acrylate in ethyl acetate, where ethyl acetate was 99% by weight of the solution. The mixture also contained 0.2% by weight of Irgacure 184 as initiator. The reaction was carried out by exposure to UV radiation (General Electric and Sylvania F40BL-Black Light, 12.5 cm from source, emission between 310–430 nm with peak emission at 380 nm) under nitrogen for 2 hours, at which time 2.5 parts of VDM were added. The reaction was continued under nitrogen with UV radiation exposure for an additional 1.5 h. The oligomer formed a microgel in solution.

The following examples describe the preparation of functional, branched materials with potential applications in viscosity and thixotropy control. The first four examples demonstrate materials prepared with chain transfer agents to control molecular weight. The second two examples demonstrate the effect of dilution on prevention of gelation and control of molecular weight for branched oligomers.

Example 68

A branched functional oligomer was synthesized by polymerizing 76 parts isooctyl acrylate (IOA), 19 parts isobornyl acrylate (IBA), and 5 parts 2-hydroxyethyl acrylate (HEA) in a glass reaction vessel at 50 wt. % solids in ethyl acetate. 1.5 parts 2-mercaptoethanol was added as a chain transfer agent and 0.5 parts 1,6-hexanediol diacrylate (HDDA) as a branching agent. The initiator was 0.2 parts VAZO 52. The reaction took place under $N_2$ at 60° C. for 16 hours.

Example 69

A branched functional oligomer was synthesized by polymerizing 76 parts isooctyl acrylate (IOA), 19 parts isobornyl acrylate (IBA), and 5 parts 2-hydroxyethyl acrylate (HEA) in a glass reaction vessel at 50 wt. % solids in ethyl acetate. 1.5 parts mercaptoethanol was added as a chain transfer agent and 0.5 parts 1,6-hexanediol diacrylate (HDDA) as a branching agent. The initiator was 0.2 parts Irgacure 184 (Ciba). The vessel was exposed to UV radiation (General Electric and Sylvania F40BL-Black Light, 12.5 cm from source, emission between 310–430 nm with peak emission at 380 nm) under $N_2$ for 16 hours.

Example 70

Oligomeric azlactone-functional oligomer can be directly polymerized to yield a material wherein each monomer has a reactive group, as follows. A glass polymerization bottle was charged with 130 g VDM, 193.5 g ethyl acetate, and 5.3 g trifluoroacetic acid. The bottle was purged with nitrogen, sealed, and tumbled in a water bath maintained at 60° C. The number average molecular weight of the resulting poly (VDM) was 1000.

Example 71

A branched functional oligomer was synthesized by polymerizing 76 parts isooctyl acrylate (IOA), 19 parts isobornyl acrylate (IBA), and 5 parts 2-hydroxyethyl acrylate (HEA) in a glass reaction vessel at 10 wt. % solids in ethyl acetate. Also, 0.5 parts 1,6-hexanediol diacrylate (HDDA) as a branching agent and 0.2 parts Irgacure 184 as a UV initiator were added. The vessel was exposed to UV radiation (General Electric and Sylvania F40BL-Black Light, 12.5 cm from source, emission between 310–430 nm with peak emission at 380 nm) under $N_2$ for 16 hours.

Example 72

A branched functional oligomer was synthesized by polymerizing 76 parts isooctyl acrylate (IOA), 19 parts isobornyl acrylate (IBA), and 5 parts 2-vinyl-4,4-dimethylazlactone (VDM) in a glass reaction vessel at 10 wt. % solids in ethyl acetate. Also, 0.5 parts 1,6-hexanediol diacrylate (HDDA) as a branching agent and 0.2 parts Irgacure 184 as a UV initiator were added. The vessel was exposed to UV radiation (General Electric and Sylvania F40BL-Black Light, 12.5 cm from source, emission between 310–430 nm with peak emission at 380 nm) under N2 for 16 hours.

Example 73

This example demonstrates the reactivity of the previously described oligomers. Complementary combinations of oligomers from examples 68–72 were mixed together on a 1:1 mole ratio based on reactive functionality. Table 11 is a summary of the results.

TABLE 11

| Oligomer Combination | Without Catalyst | DBU (0.5% by wt) |
|---|---|---|
| Examples 68 + 70 | No reaction | Gel |
| Examples 69 + 70 | No reaction | Gel |
| Examples 71 + 72 | No reaction | Gel |

The invention claimed is:

1. A curable adhesive composition comprising:
a) a first component oligomer, having a carbon-carbon backbone, and a degree of polymerization <300, comprising a plurality of polymerized monomer units comprising pendant reactive nucleophilic or electrophilic functional groups; and
b) a second component oligomer having a carbon-carbon backbone, and a degree of polymerization <300, comprising a plurality of polymerized monomer units comprising pendant functional groups co-reactive wit said pendant reactive nucleophilic or electrophilic functional groups of said first component oligomer;
wherein each of a) and b) has a functionality of greater than 2, and the curable adhesive composition has a residual content of less than 2 weight %, wherein the composition, when cured, has a $T_g$ of −15° C. or lower, and
wherein said nucleophilic functional groups are selected form hydroxy, amino, thiol, carboxy and acetoacetyl functional groups and said electrophilic functional groups are selected from oxazolinyl, aziridinyl, (thio)epoxy, isocyanate, acid halide and anhydride functional groups.

2. The composition of claim 1 further comprising a step-growth catalyst.

3. The composition of claim 1 which comprises an amount of said second component oligomer sufficient to provide more than two crosslinks per first component oligomer chain.

4. The composition of claim 1 which comprises
(a) from 0.1 to 99.9 parts by weight of said first component oligomer, and
(b) from 99.9 to 0.1 parts by weight of said second component oligomer.

5. The composition of claim 1 having a viscosity of 500 to 10,000 cPs at 22° C., prior to curing.

6. The composition of claim 1 wherein said first component oligomer comprises
(a) from 0.01 to 99.99 parts by weight of polymerized monomer units derived from acrylic acid esters of non-tertiary alkyl alcohols containing 1–30 carbon atoms;
(b) from 99.99 to 0.01 parts by weight of polymerized monomer units derived from an ethylenically-unsaturated monomer having a reactive nucleophilic and/or electrophilic functional group.

7. The composition of claim 6 wherein said non-tertiary alkyl alcohols have 14–30 carbon atoms.

8. The composition of claim 1 wherein said first component oligomer comprises
(a) from 75.00 to 99.99 parts by weight of polymerized monomer units derived from acrylic acid esters of non-tertiary alkyl alcohols containing 1–30 carbon atoms;
(b) from 0.01 to 5.00 parts by weight of polymerized monomer units derived from of an ethylenically-unsaturated monomer having a reactive nucleophilic or electrophilic functional group;
(c) from 0 to 10 parts by weight of at least one polar monomer; and
(d) from 0 to 10 parts by weight of at least one other monomer.

9. The composition of claim 8 wherein said polar monomer, when present, is selected from the group consisting of substituted (meth)acrylamides, N-vinyl pyrrolidone, N-vinyl caprolactam, acrylonitrile, tetrahydrofurfuryl acrylate, and mixtures thereof.

10. The composition of claim 1 wherein said second component oligomer comprises
(a) from 75.00 to 99.99 parts by weight of polymerized monomer units derived from acrylic acid esters of non-tertiary alkyl alcohols containing 1–30 carbon atoms;
(b) from 0.01 to 5.00 parts by weight of polymerized monomer units derived from ethylenically-unsaturated monomer possessing a nucleophilic or electrophilic functional group co-reactive with said reactive groups of said first oligomer;
(c) from 0 to 10 parts by weight of at least one polar monomer; and
(d) from 0 to 10 parts by weight of at least one monomer selected from the group consisting of vinyl monomers and alkyl methacrylates.

11. The composition of claim 1 wherein at least one of said reactive and co-reactive functional groups are protected functional groups.

12. The composition of claim 10 wherein said second oligomer is prepared in situ by the free-radical polymerization of a monomer mixture comprising
(a) from 75.00 to 99.99 parts by weight of polymerized monomer units derived from acrylic acid esters of non-tertiary alkyl alcohols containing 1–30 carbon atoms; and
(b) from 0.01 to 5.00 parts by weight of polymerized monomer units derived from an ethylenically-unsaturated monomer possessing a nucleophilic or electrophilic functional group, co-reactive with said reactive groups of said first component oligomer;
(c) from 0 to 10 parts by weight of at least one polar monomer;
(d) from 0 to 10 parts by weight of other monomers with the proviso that, prior to crosslinking, the residual content is less than 2 wt. %.

13. The composition of claim 12, wherein said electrophilic functional group of said ethylenically-unsaturated monomer possessing a electrophile functional group is selected from (thio)epoxy, aziridinyl, oxazolinyl, isocyanato and azlactone functional groups.

14. The composition of claim 1 wherein said first component oligomer and said second component oligomer are different oligomers.

15. The composition of claim 1, wherein essentially each repeat unit of said first oligomer comprises a pendant reactive functional group.

16. The composition of claim 15 wherein said oligomer comprises poly(2-vinyl-4,4-dimethylazlactone).

17. A crosslinked composition comprising the composition of claim 1, having an average molecular weight between crosslinks, $M_C$, of $\geq 1000$ when cured.

18. The composition of claim 1 further comprising a tackifier.

19. The Composition of claim 1, wherein the composition is melt processible.

20. A process for making a substrate bearing an adhesive coating of a crosslinked polymer composition on at least one surface thereof, comprising the steps of:
    (a) coating onto said substrate the adhesive composition of claim 1; and
    (b) thermally crosslinking said first oligomer component and second component of said adhesive composition by forming covalent bonds between said reactive groups of said first component oligomer and co-reactive groups of said second component oligomer.

21. The process of claim 20 wherein said adhesive composition further comprises a step-growth catalyst.

22. The process of claim 20 wherein said adhesive composition has been partially convened to a coatable viscosity of from 750 to 7,500 cPs at 22° C. prior to step a.

23. The process of claim 20 wherein said adhesive composition comprises
    (a) per 100 parts by weight of said first component oligomer, an amount of said second component oligomer sufficient to provide more than two crosslinks per first component oligomer chain;
    (b) less than 2 parts by weight residuals content; and
    (c) from 0.0001 to about 3.0 parts by weight of a step-growth catalyst.

24. The process of claim 20 wherein at least one of said reactive and co-reactive functional groups are protected functional groups.

25. The process of claim 20 wherein said second component oligomer is prepared in situ by the free-radical polymerization of a monomer mixture comprising
    (a) from 75.00 to 99.99 parts by weight of polymerized monomer units derived from acrylic acid esters of non-tertiary alkyl alcohols containing 1–30 carbon atoms;
    (b) from 0.01 to 5.00 parts by weight of polymerized monomer units derived from an ethylenically-unsaturated monomer possessing a co-reactive nucleophilic or electrophilic functional group;
    (c) from 0 to 10 parts by weight of at least one polar monomer; and
    (d) from 0 to 10 parts by weight of other monomers;
    with the proviso that, prior to crosslinking, the residual content is less than 2 wt. %.

26. The process of claim 20 wherein said oligomer is prepared by sequential addition of reactive-and co-reactive functional group-containing monomers.

27. The process of claim 26 comprising the steps of:
    (a) partially polymerizing a mixture comprising a reactive functional group-containing monomer;
    (b) adding a co-reactive functional group containing monomers;
    (c) further polymerizing the mixture, with the proviso that the mixture has a residual content of less than 2 wt. %.

28. The process of claim 20 wherein the molecular weight of said first component oligomer is controlled with a chain transfer agent.

29. The process of claim 20 wherein said ethylenically-unsaturated functional monomer of said first component oligomer is an azlactone group substituted functional monomer.

30. The composition of claim 1, curable by a step-growth addition process.

* * * * *

UNITED STATES PATENT AND TRADEMARK OFFICE
CERTIFICATE OF CORRECTION

PATENT NO. : 7,015,286 B2  Page 1 of 1
APPLICATION NO. : 10/455571
DATED : March 21, 2006
INVENTOR(S) : Steven M. Heilmann et al.

It is certified that error appears in the above-identified patent and that said Letters Patent is hereby corrected as shown below:

Col. 8
Line 38, delete "has-a" and insert -- has a --, therefor.

Col. 17
Line 13, delete "10,000" and insert -- 10,000+ --, therefor.

Col. 19
Line 37, delete "10 g" and insert -- 100 g --, therefor.

Col. 22
Lines 47-48, delete "VIIB/VIIB," and insert -- VIB/VIIB, --, therefor.

Col. 31
Line 18, delete "N2" and insert -- $N_2$ --, therefor.
Line 45, in Claim 1, delete "wit" and insert -- with --, therefor.

Col. 33
Line 5, in Claim 13, delete "electrophile" and insert -- electrophilic --, therefor.
Line 21, in Claim 19, delete "Composition" and insert -- composition --, therefor.
Line 36, in Claim 22, delete "convened" and insert -- converted --, therefor.

Col. 34
Line 29, in Claim 27, delete "group containing" and insert -- group-containing --, therefor.

Signed and Sealed this

Twentieth Day of November, 2007

JON W. DUDAS
*Director of the United States Patent and Trademark Office*